(12) United States Patent
Heskel et al.

(10) Patent No.: US 8,033,005 B1
(45) Date of Patent: Oct. 11, 2011

(54) METHOD FOR MAKING DEBRIS-FREE NAIL COLLATION

(75) Inventors: Isaac H. Heskel, Highland Park, IL (US); Lawrence S. Shelton, Morton Grove, IL (US); Donald E. Bergstrom, Lindenhurst, IL (US); Michael J. Christensen, Parkers Prairie, MN (US); Algis P. Suopys, Lindenhurst, IL (US); Eldrige J. Presnell, Round Lake Beach, IL (US); Joseph J. Righter, Jr., Rolling Meadows, IL (US); Richard W. Mrozik, Jr., West Dundee, IL (US)

(73) Assignee: Illinois Tool Works Inc., Glenview, IL (US)

( * ) Notice: Subject to any disclaimer, the term of this patent is extended or adjusted under 35 U.S.C. 154(b) by 0 days.

(21) Appl. No.: 12/627,692

(22) Filed: Nov. 30, 2009

Related U.S. Application Data

(63) Continuation of application No. 12/326,312, filed on Dec. 2, 2008, now abandoned.

(51) Int. Cl.
B23P 25/00 (2006.01)
(52) U.S. Cl. .......................................................... 29/458
(58) Field of Classification Search .................... 29/458, 29/527.2, 460, 467, 759, 527.1; 411/442, 411/444, 966, 443; 206/344, 338, 813; 227/136
See application file for complete search history.

(56) References Cited

U.S. PATENT DOCUMENTS

| | | |
|---|---|---|
| 1,792,235 A | 2/1931 | Maynard |
| 2,991,477 A | 7/1961 | Hoyle, Jr. et al. |
| 3,082,425 A | 3/1963 | Leslie |
| 3,212,632 A | 10/1965 | Baum et al. |
| 3,303,632 A | 2/1967 | Halstead |
| 3,315,436 A | 4/1967 | Baum et al. |
| 3,342,659 A | 9/1967 | Baum et al. |
| 3,348,669 A | 10/1967 | Powers |
| 3,357,761 A | 12/1967 | Langas et al. |
| 3,358,822 A | 12/1967 | O'Connor |

(Continued)

FOREIGN PATENT DOCUMENTS

GB      1282359 A1      7/1972

(Continued)

OTHER PUBLICATIONS

Stanley Bostitch Sheather Plus specification sheet, The Stanley Works 2002.

(Continued)

*Primary Examiner* — John C Hong
(74) *Attorney, Agent, or Firm* — Levenfeld Pearlstein, LLC

(57) ABSTRACT

A method for making a collated fastener assembly includes the steps of arranging a plurality of fasteners each having a head and a tip, in a row parallel to one another, the fasteners being arranged in a plane. The plurality of fasteners are preheated to elevate the temperature of the fasteners and a molten polymer material is applied onto the preheated plurality of fasteners. The fasteners, maintained in the plane, are conveyed with the molten polymer thereon between a pair of forming wheels. The molten polymer material is molded onto the preheated fasteners and between adjacent fasteners to form a plastic molding having a collar encircling a shank of each fastener and a connecting portion between adjacent fasteners. A cooling vapor is sprayed onto the fasteners and the plastic molding as the fasteners and the plastic molding exit from between the molding wheels. A gaseous cooling stream is forced over the fasteners and the plastic molding to cool the strip to form the fastener assembly.

27 Claims, 14 Drawing Sheets

U.S. PATENT DOCUMENTS

| | | |
|---|---|---|
| 3,432,985 A | 3/1969 | Halstead |
| 3,463,304 A | 8/1969 | Gallee et al. |
| 3,471,008 A | 10/1969 | Reich et al. |
| 3,491,389 A | 1/1970 | Leistner |
| 3,592,339 A | 7/1971 | Briggs, Jr. |
| 3,616,083 A | 10/1971 | Mohr |
| 3,625,352 A | 12/1971 | Perkins |
| 3,729,885 A | 5/1973 | Mosetich et al. |
| 3,736,198 A | 5/1973 | Leistner |
| 3,756,391 A | 9/1973 | Keck et al. |
| 3,813,985 A | 6/1974 | Perkins |
| 3,828,924 A | 8/1974 | Perkins |
| 3,861,527 A | 1/1975 | Perkins |
| 3,862,685 A | 1/1975 | Mosetich et al. |
| 3,878,663 A | 4/1975 | Shelton |
| 3,889,450 A | 6/1975 | Danielson et al. |
| 3,904,032 A | 9/1975 | Maier |
| 3,944,068 A | 3/1976 | Maier et al. |
| 3,966,042 A | 6/1976 | Shelton et al. |
| 3,967,727 A | 7/1976 | Jakesch |
| 3,992,852 A | 11/1976 | Schwarz et al. |
| 4,162,728 A | 7/1979 | Uzumcu et al. |
| 4,167,229 A | 9/1979 | Keusch et al. |
| 4,250,996 A | 2/1981 | Bartz |
| 4,298,121 A | 11/1981 | Oide et al. |
| 4,343,579 A | 8/1982 | Shelton et al. |
| 4,370,082 A | 1/1983 | Sundberg |
| 4,383,608 A | 5/1983 | Potucek |
| 4,679,975 A | 7/1987 | Leistner |
| 4,711,980 A | 12/1987 | Leistner |
| 4,804,088 A | 2/1989 | MacDonald |
| 4,805,687 A | 2/1989 | Gall |
| 4,836,372 A | 6/1989 | Shelton |
| 4,867,366 A | 9/1989 | Kleinholz |
| 4,881,643 A | 11/1989 | Pfister |
| 4,932,821 A | 6/1990 | Steffen et al. |
| 4,971,503 A | 11/1990 | Barnell et al. |
| 5,005,699 A | 4/1991 | Kawashima et al. |
| 5,058,228 A | 10/1991 | Wright et al. |
| 5,140,715 A | 8/1992 | Moracelli |
| 5,149,237 A | 9/1992 | Gabriel et al. |
| 5,441,373 A | 8/1995 | Kish et al. |
| 5,443,345 A | 8/1995 | Gupta |
| 5,509,768 A | 4/1996 | Hon |
| 5,522,687 A | 6/1996 | Chen |
| 5,609,712 A | 3/1997 | Takumi |
| 5,713,709 A | 2/1998 | Huang |
| 5,733,085 A | 3/1998 | Shida et al. |
| 5,795,121 A | 8/1998 | Tucker et al. |
| 5,836,732 A | 11/1998 | Gupta et al. |
| 5,865,311 A | 2/1999 | Hentges et al. |
| 5,931,298 A | 8/1999 | Huang |
| 5,931,622 A | 8/1999 | Gupta et al. |
| 6,044,972 A | 4/2000 | Rohrmoser et al. |
| 6,082,536 A | 7/2000 | Ito et al. |
| 6,086,304 A | 7/2000 | Hujishima et al. |
| 6,394,268 B1 | 5/2002 | Dill et al. |
| 6,524,387 B2 | 2/2003 | Arslanouk et al. |
| 6,705,464 B1 | 3/2004 | Yang |
| 6,708,821 B2 | 3/2004 | Tucker et al. |
| 6,758,018 B2 | 7/2004 | Sutt, Jr. |
| 6,779,959 B1 | 8/2004 | Yang |
| 6,823,990 B2 | 11/2004 | Gaudron |
| 6,880,700 B2 | 4/2005 | Osuga et al. |
| 6,880,723 B2 | 4/2005 | Osuga et al. |
| D541,125 S | 4/2007 | Gaudron |
| 7,198,446 B2 | 4/2007 | Yoshizawa et al. |
| 7,556,138 B2 | 7/2009 | Kim |
| 2004/0118720 A1 | 6/2004 | Powers et al. |
| 2007/0237607 A1 | 10/2007 | Lat |
| 2007/0264103 A1 | 11/2007 | Shelton et al. |
| 2008/0131232 A1 | 6/2008 | Heskel et al. |
| 2008/0282529 A1 | 11/2008 | Shelton et al. |
| 2008/0317563 A1 | 12/2008 | Shida et al. |

FOREIGN PATENT DOCUMENTS

| | | |
|---|---|---|
| WO | 9742421 A1 | 11/1997 |
| WO | 2007133663 A1 | 11/2007 |
| WO | 2008001790 A1 | 1/2008 |

OTHER PUBLICATIONS

International Search Report and Written Opinion of the International Searching Authority issued in connection with PCT/US2007/011356 on Oct. 4, 2007.

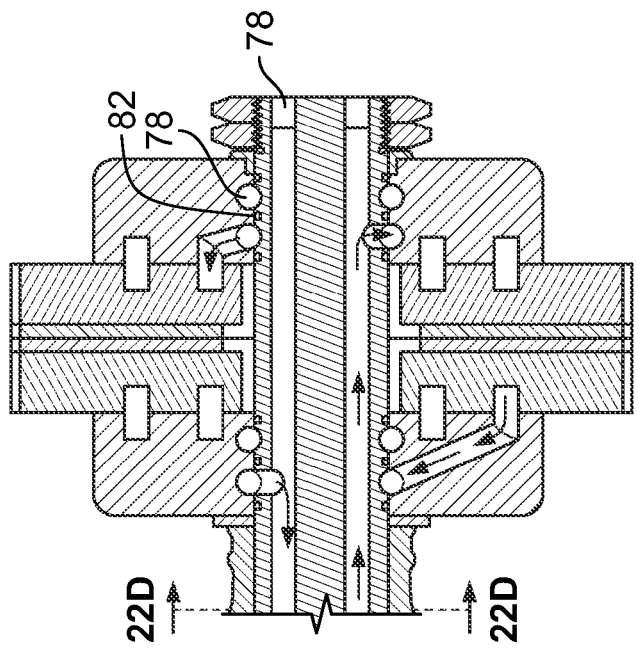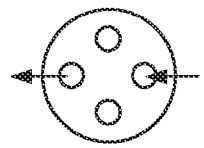
FIG. 22C
FIG. 22D
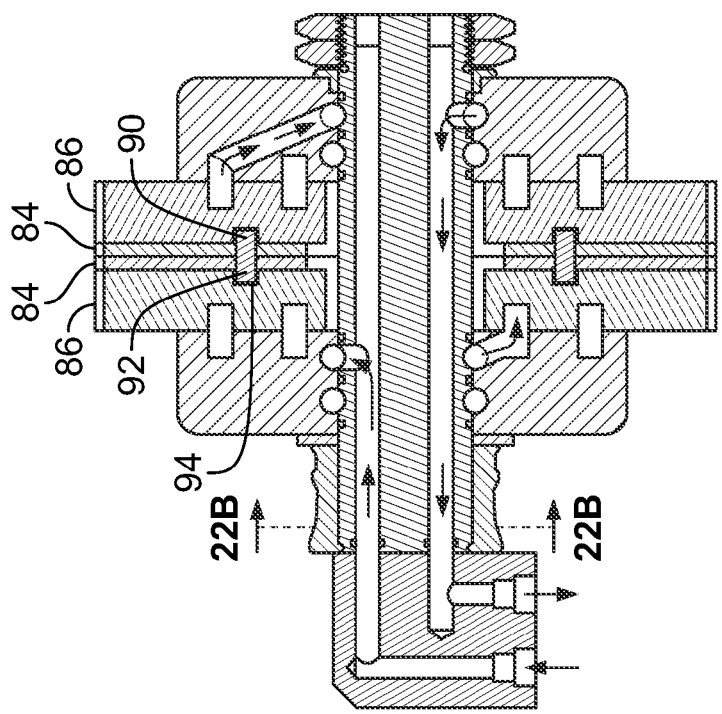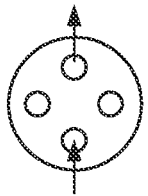
FIG. 22A
FIG. 22B

METHOD FOR MAKING DEBRIS-FREE NAIL COLLATION

BACKGROUND OF THE INVENTION

The present invention pertains to debris-free fastener collations. More particularly, the present invention pertains to a method for making a debris-free collated nail strip formed with a plastic material for use in a fastener driving tool.

Fast-acting fastener driving tools are in widespread use in the construction industry and used in industries ranging from pre-fabricated housing construction to luxury residential, commercial and industrial construction.

The nails that are used in these tools are assembled in strips that are inserted into a magazine. There are two principal nail strip or nail collation formations—paper tape and plastic. As the name suggests, paper tape collations maintain the nails in a strip by using a strip of tape that is adhered to one or both sides of the arranged nails. Plastic collations use a formed or pre-formed collar-type element to secure the fasteners to one another and parallel in the strip form.

Paper tape has certain advantages, one of which is ease of manufacture. In addition, paper tape collations, which us a glue or adhesive to adhere the tape to the fasteners, tend to be quite rigid, but sufficiently easy to separate one fastener from an adjacent fastener, as when the fastener is driven from the tool into a substrate. While rigidity on the one hand is good for the collation in that it reduces the opportunity for strip corrugation, on the other hand, it tends to require additional force to separate the fastener from the strip. Moreover, paper tape collations also produce a significant amount of debris when the fastener is separated from the strip. This debris can cause increased tool maintenance as well as jamming and increased down-time for tool repair.

Plastic collations use a collar that is molded to or fit around the shank of the fasteners. The collars are connected by bridges that break or separate to permit the fastener to be separated from the strip. One drawback to commonly available plastic collations is that the collation, although molded around the fastener, is nevertheless only superficially affixed to the fastener. That is, although the fastener is supported within and by the collation, the fastener can be rotated within the collar. It may not be loosely held, but can nonetheless be rotated. This has two ramifications.

First, because the fasteners are loosely supported, the collation can be overly flexible. This can result in increased corrugation of the strip in the tool magazine. Second, because the plastic is only loosely affixed to the fastener, it has been observed the plastic collars and bridges fracture as the fastener is driven into the substrate. This has been shown to result in the generation of debris, and in certain instances substantial amounts of debris. At times, it has also been found that the collars collect under the fastener head, thus preventing the fastener from being driven fully into the substrate. This may thus require a user to then drive, by hand, e.g., with a hammer, the fastener the remainder of the way into the substrate. Another drawback to the known plastic collations was that because the collation material was quite brittle, the downstream collation fractured, causing fasteners to become off-centered in the tool, which resulted in tool jams and misfires.

In an effort to eliminate the drawbacks associated with the generation of debris and the accumulation of material under the fastener head, and off-centered driven fasteners, a debris-free fastener was developed that uses an adhesive-modified chemistry for the plastic collation material in conjunction with preheating the fasteners prior to application (molding) of the collation.

It was found that the improved, debris-free collation generated significantly less debris and that the plastic collation material adhered well to the fastener shank. As a result, the plastic material entered the substrate as the fastener was driven from the strip into the substrate. Such a fastener collation is disclosed in Shelton, U.S. patent application Ser. No. 11/383,032, filed May 12, 2006, Shelton, U.S. patent application Ser. No. 11/734,684, filed Apr. 12, 2007, and Heskel, U.S. patent application Ser. No. 11/935,541, filed Nov. 6, 2007, all of which are commonly assigned with the present application and are incorporated herein by reference.

While the above-noted fastener collations overcame many of the drawbacks in prior fastener collations, they were found to be very difficult to manufacture. Using known manufacturing techniques resulted in too much flow of the collation material and thus mis-formed collations, sticking of the collation material to the forming molds, and other manufacturing obstacles.

Accordingly, there is a need for a method for forming a plastic collation system for strip-formed fasteners. Desirably, such a method provides a high quality collation formed on the fasteners. More desirably, such a method uses adhesive-modified materials for the plastic collation. More desirably still, such a collation forming method can be carried out in a high speed process with little to no waste or rejection of product. Most desirably, such a method forms a plastic collation formulated from an adhesive polymer such as a polyolefin, such that when the fastener is driven from a driving tool, the collar portion remains adhered to the fastener so that the collar portion penetrates the substrate with the fastener.

BRIEF SUMMARY OF THE INVENTION

A method for making a collated fastener assembly includes the steps of arranging a plurality of fasteners in a row parallel to one another, and in a plane. The fasteners each have a head and a tip.

The fasteners are preheated to elevate the temperature of the fasteners and a molten polymer is applied onto the preheated plurality of fasteners. The fasteners, with the molten polymer thereon, are conveyed between a pair of forming wheels and are maintained in the plane as they traverse between the wheels.

The molten polymer material is molded onto the preheated fasteners and between adjacent fasteners to form a plastic molding having a collar encircling a shank of each fastener and a connecting portion between adjacent fasteners. A cooling vapor is sprayed onto the fasteners and the plastic molding as the fasteners and the plastic molding exit from between the molding wheels. A gaseous cooling stream is forced over the fasteners and the plastic molding to cool the strip to form the fastener assembly. The collation so formed does not use a paper tape. That is, it is a paper tape-less collation.

In a present method, the fasteners are preheated to a temperature of about 500 deg. F. to about 620 deg. F., and preferably, about 600 deg. F. The molten polymer is heated to a temperature of about 400 deg. F. to about 440 deg. F., and preferably about 410 deg. F. prior to being applied to the fasteners.

The cooling vapor is water. In a present method, the water vapor is sprayed on the fastener assembly (after collation formation) from above and below, as the collation exits the forming wheels. To further cool the assembly, a gaseous cooling stream, preferably air, is forced or blown over the fasteners.

A group of fasteners is severed from the assembly to form a strip of predetermined length or number of fasteners.

Following forming the strip, the fasteners can be preheated (at the tip) and a coating applied to the fasteners at about their respective tips.

In a present method, the fasteners are arranged parallel to one another and at an angle to a longitudinal axis of each fastener between zero degrees and 90 degrees. A preferred angle is between about 15 degrees and about 35 degrees. The angle can be monitored to prevent out of angle fasteners from continuing through the collation process.

A preferred method included the step of aligning the fasteners with one another such that the head of each fastener is about aligned with the head of each other fastener. The alignment step can be carried out prior to the step of preheating the plurality of fasteners.

The method can also include the step of realigning the fasteners with one another such that the head of each fastener is about aligned with the head of each other fastener following the step of molding the molten polymer on to the preheated fasteners (before the polymer has fully hardened or cured).

These and other features and advantages of the present invention will be apparent from the following detailed description, in conjunction with the appended claims.

BRIEF DESCRIPTION OF THE SEVERAL VIEWS OF THE DRAWINGS

The benefits and advantages of the present invention will become more readily apparent to those of ordinary skill in the relevant art after reviewing the following detailed description and accompanying drawings, wherein:

FIGS. 22A-D are partial sectional views of the forming wheels and shaft, as taken along lines 22A-22A through 22D-22D.

DETAILED DESCRIPTION OF THE INVENTION

Figure 1:
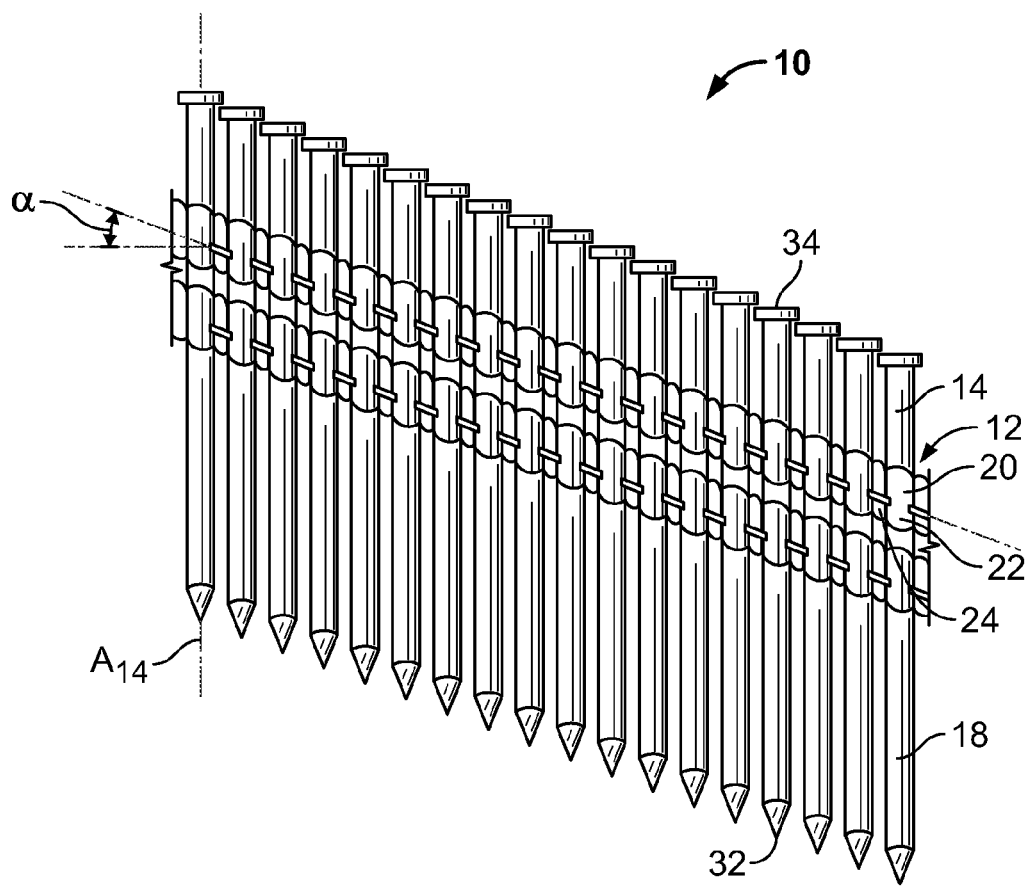
FIG. 1 is a plan view of an exemplary nail collation formed in accordance with a method of the present invention.
Figure 2:
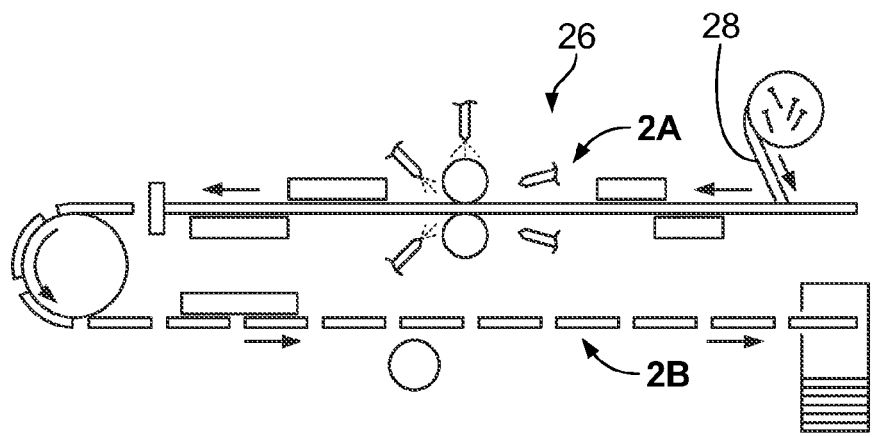
FIG. 2 is a schematic illustration of an apparatus for carrying out the present method.
Figure 2A:
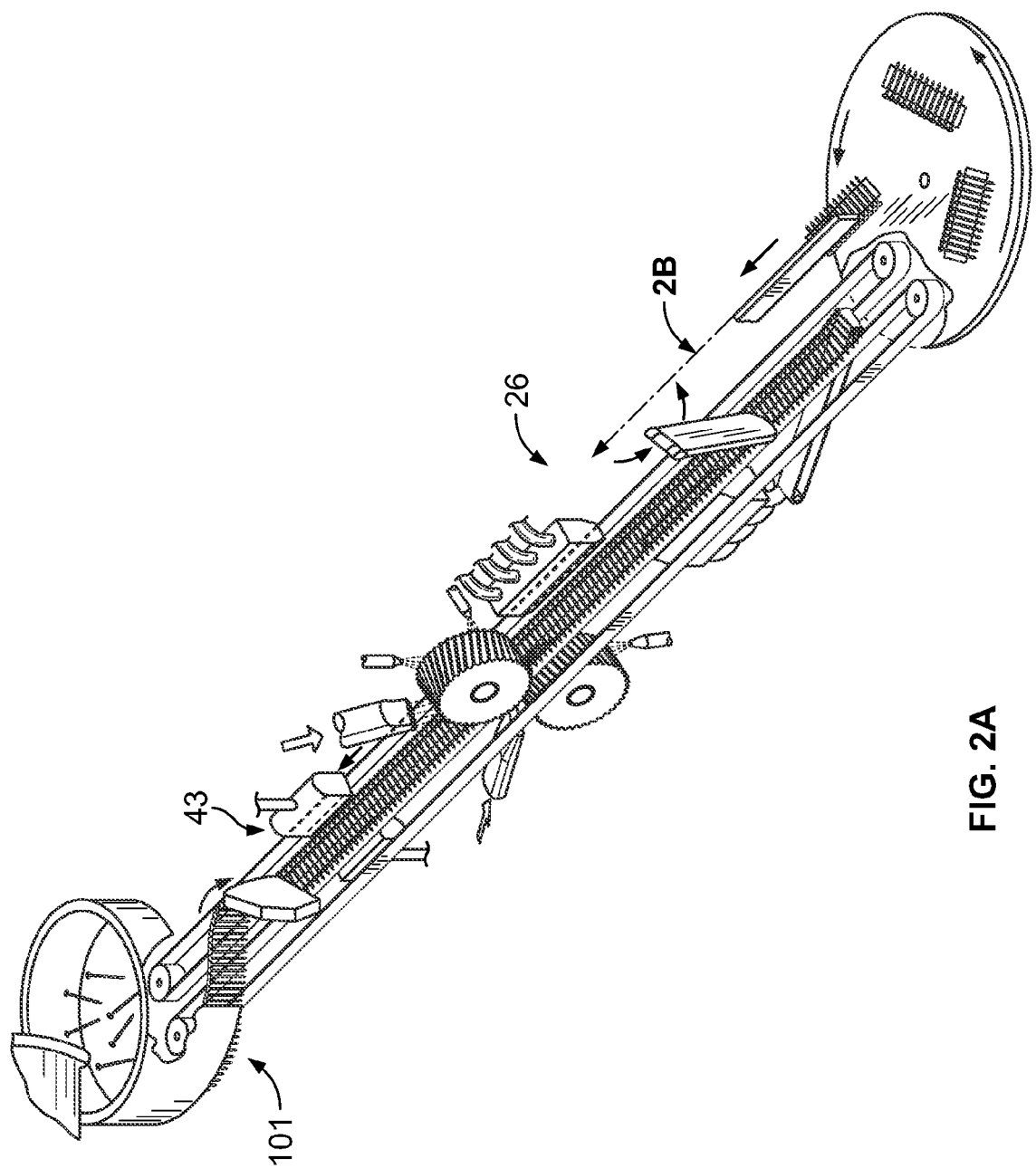
FIGS. 2A and 2B are partial illustrations, as indicated in FIG. 2, of the apparatus and method carried out thereby.
Figure 2B:
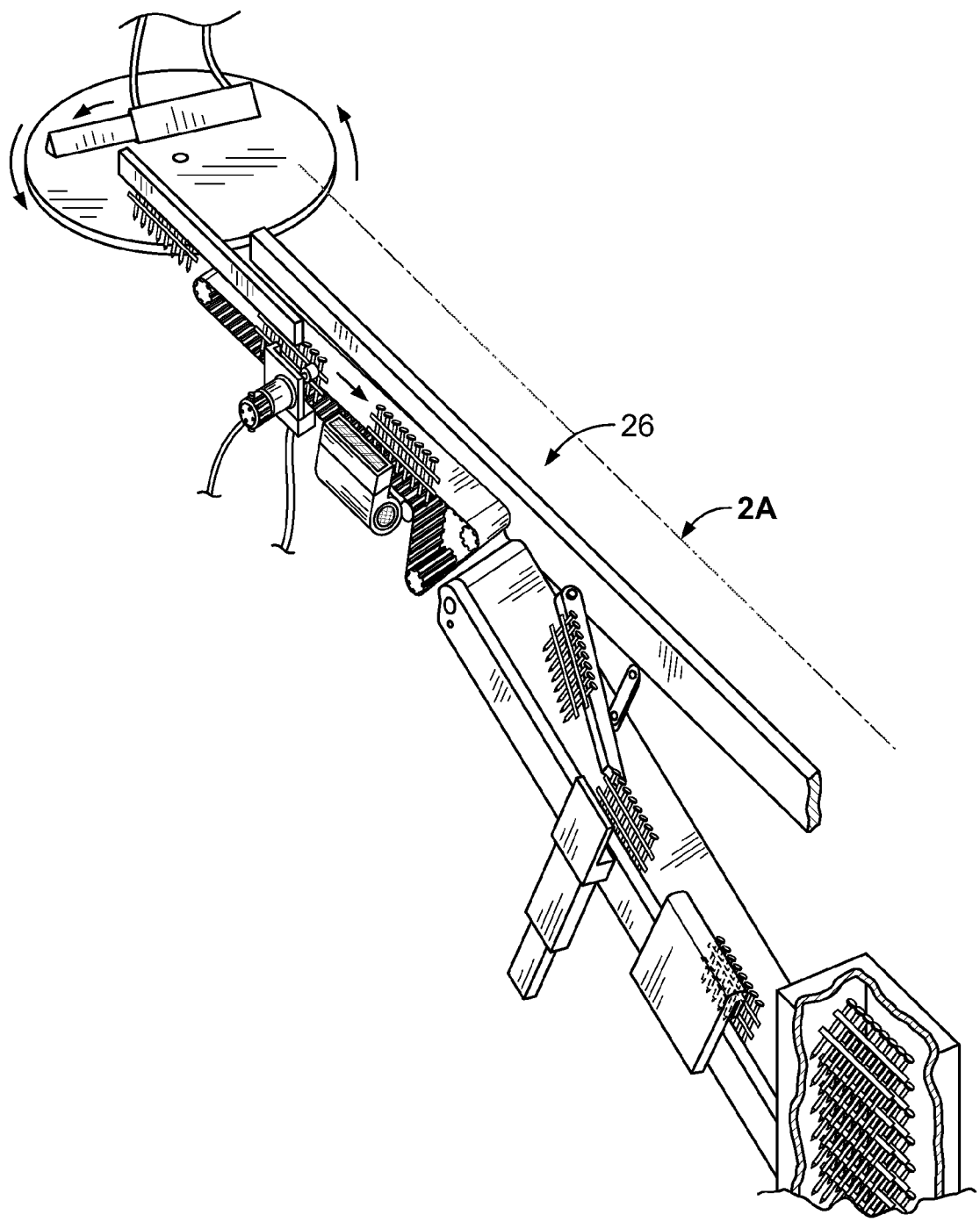
Figure 3:
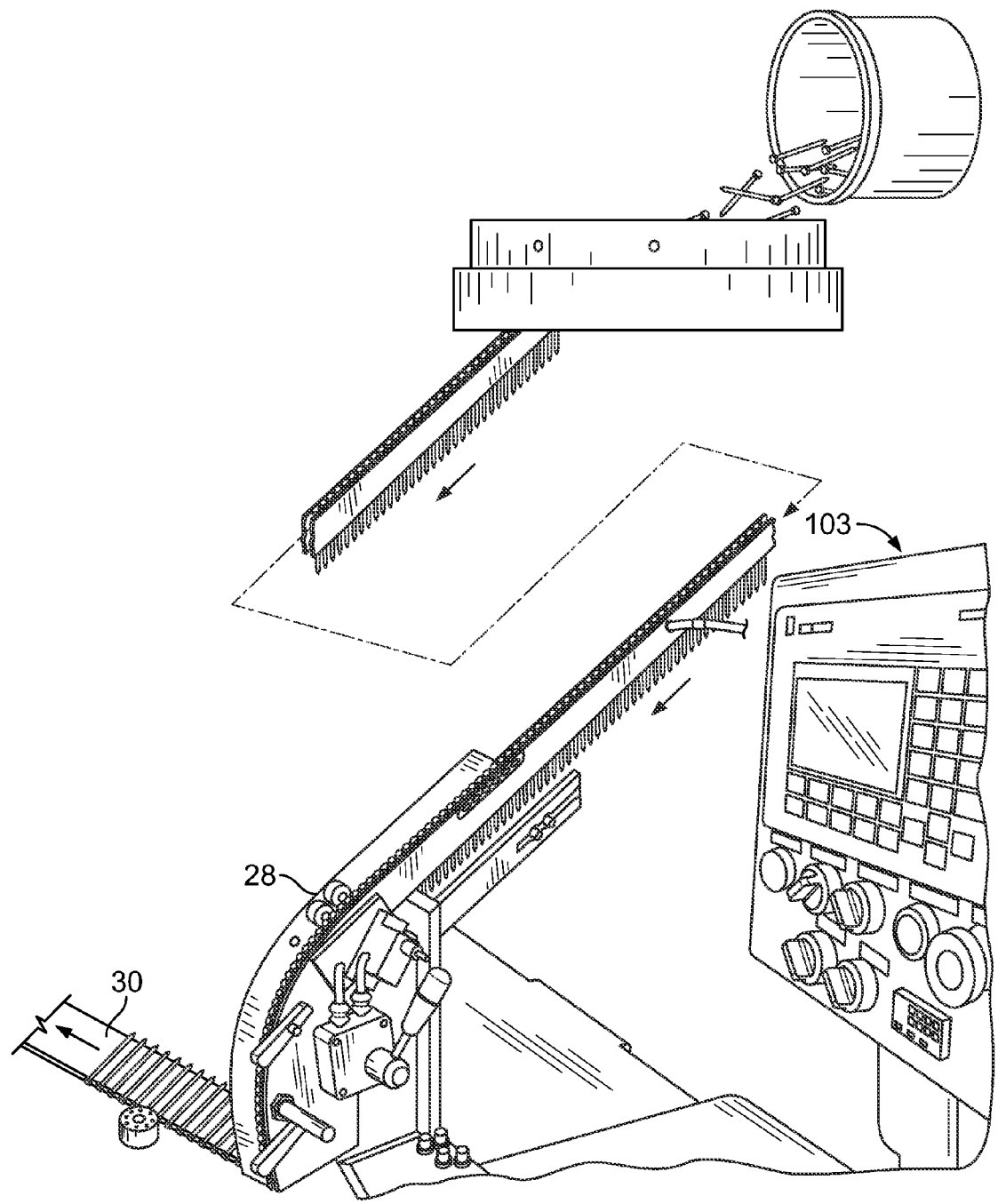
FIG. 3 is a partial, enlarged view of fasteners being positioned in a singulating and conveying apparatus for preparing the fasteners for positioning within the collation forming apparatus.
Figure 4:
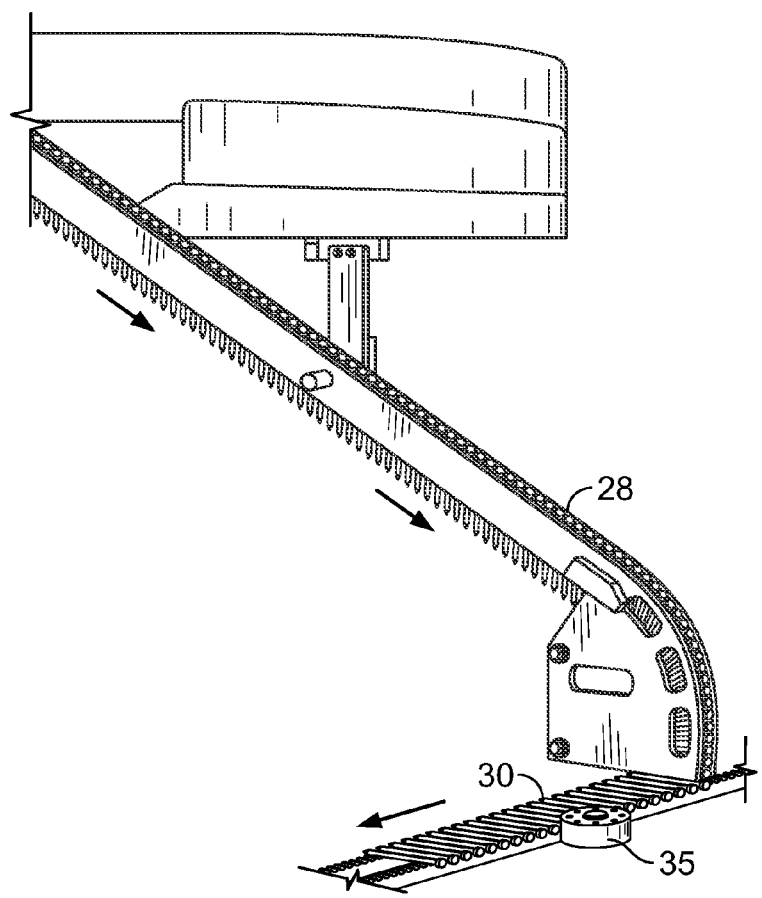
FIG. 4 is a view of the apparatus of FIG. 3 as seen from an opposite perspective.
Figure 5:
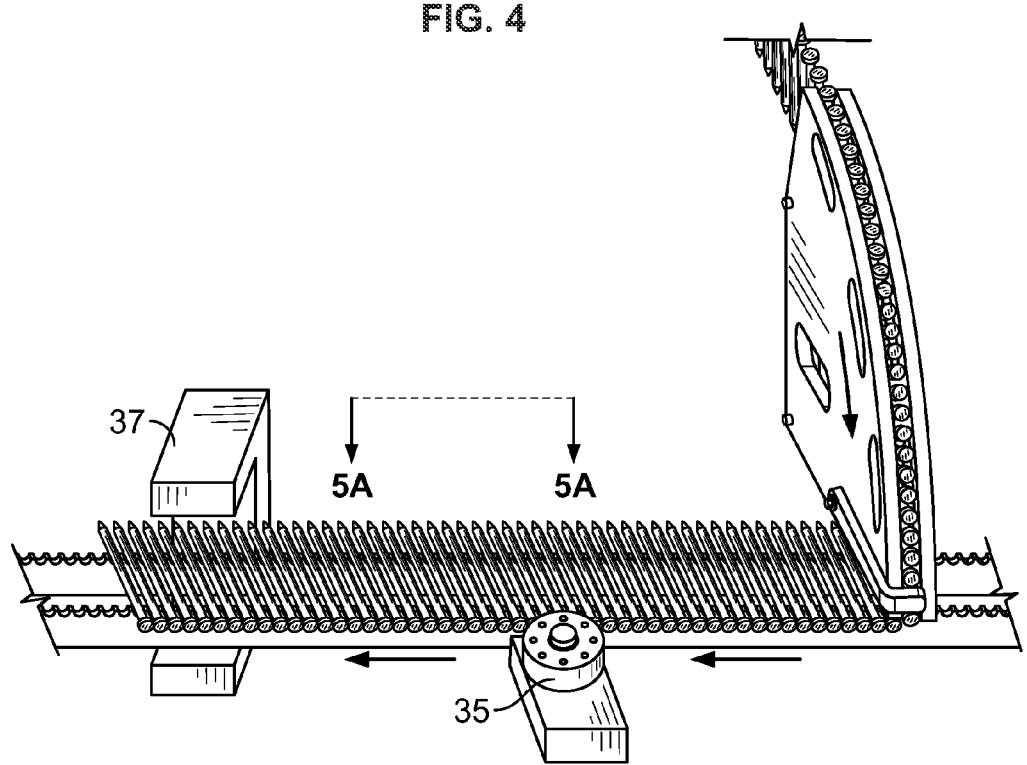
FIG. 5 is a front view of the apparatus showing the fasteners being positioned on a conveyor and showing both an alignment wheel and a fastener angle sensing station.
Figure 5A:
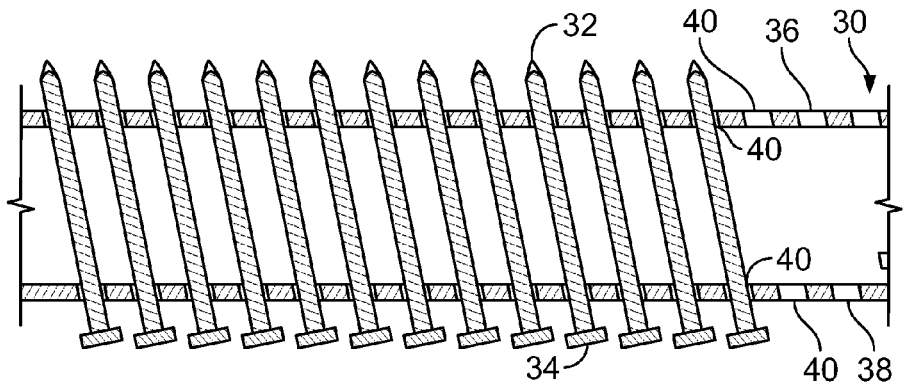
FIG. 5A is a view taken along line 5-5 showing the fasteners aligned in the conveyor (lying on the conveyor bands)
Figure 6:
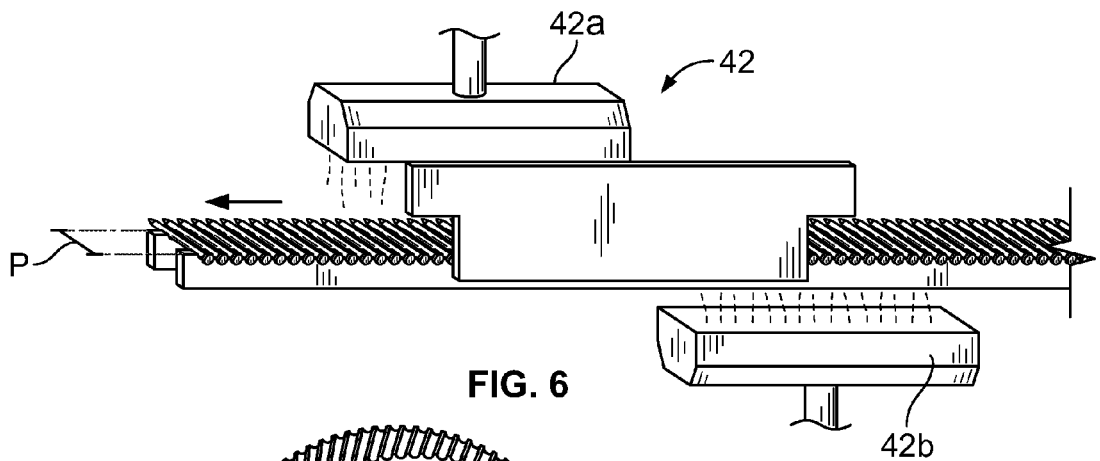
FIG. 6 is a perspective (front) view of the collation forming machine showing the fastener preheating station.
Figure 7:
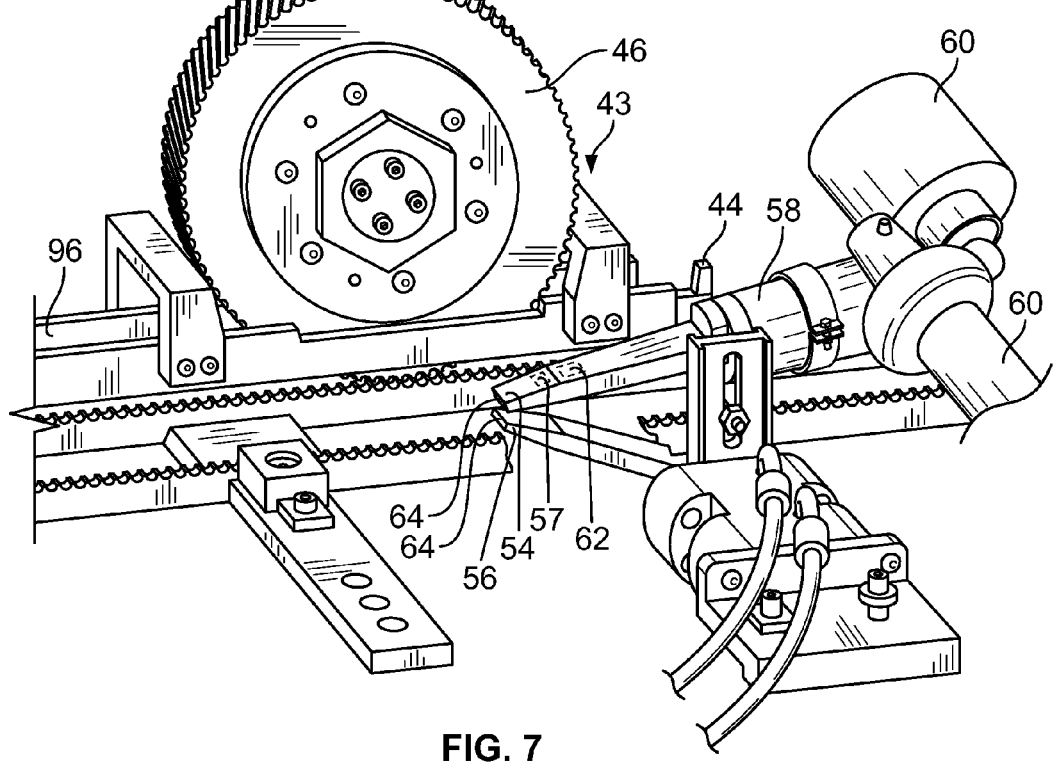
FIG. 7 is a perspective (front) view of the forming wheels shown in a disengaged state and illustrating the polymer injectors disposed above and below the plane along which the fasteners are conveyed.

While the present invention is susceptible of embodiment in various forms, there is shown in the drawings and will hereinafter be described a presently preferred embodiment with the understanding that the present disclosure is to be considered an exemplification of the invention and is not intended to limit the invention to the specific embodiment illustrated.

It should be further understood that the title of this section of this specification, namely, "Detailed Description Of The Invention", relates to a requirement of the United States Patent Office, and does not imply, nor should be inferred to limit the subject matter disclosed herein.

Referring now to the figures and in particular to FIG. 1, there is shown an exemplary nail strip 10 having a plastic collation system 12 formed thereon. The collation 12 is as disclosed in the aforementioned U.S. Patent applications to Shelton et al. and Heskel et al. In the illustrated strip 10, the nails 14 are positioned parallel to one another (e.g., with their axes $A_{14}$ parallel) and at an angle α of about 20 degrees to the transverse direction (as indicated at 16) of the strip 10. Other angles α (including zero degrees) are, however, contemplated. The nails 14 can be full head nails, D-head (or clipped head) nails or any other type of nail.

As discussed above, the nails 14 are collated and held to one another by the plastic collation 12. The plastic collation 12 is molded to, over and around the shanks 18 of the nails 14, and connects each nail 14 to its adjacent nail or nails (that is, extends between the nails 14). The collation 12 is formed as a contiguous molding around and between the nails 14; nevertheless, for purposes of this disclosure, the molding, indicated generally at 20, is viewed as having a collar portion 22, which is that portion that encircles the nail shank 18, and a connecting portion 24, which is that portion that extends between and connects adjacent collar portions 22. The collation 12 so formed does not use a paper tape. That is, it is a paper tape-less collation. Upper and lower moldings or collations 20 are shown that are formed with structure similar to one another. The structure can, however, be different from the upper to the lower collations.

As set forth above and in the aforementioned patents to Shelton et al. and Heskel et al., the present nail collation 12 differs from previously known plastic collations in a number of important aspects. First, rather than the plastic merely encircling and extending around and between the nails, the present collation 12 uses a material that is molded (or formed) around and adheres to the nails. It has been found that plastic that is adhered to the nails, rather than merely molded around the nails is advantageous in that the plastic material tends to remain on the nail shank during driving. That is, the collation 12 material is maintained on the shank 18 as the nail 14 penetrates the substrate and thus enters the substrate with the nail. Advantageously, much less debris is generated during driving of a nail from the present nail strip compared to prior known nail strips.

In addition, adhesion of the plastic material to the nails 14 also has benefits vis-à-vis the rigidity of the nail strip 10. That is, when the plastic merely encircles the nail shanks, the plastic can slip around the nail shanks. On the other hand, by adhering the plastic molding to the shanks, the nail strip tends to become more rigid and is less likely to flex and to corrugate.

A present material is an adhesive polymer, such as an adhesive polyolefin, such as a maleic anhydride modified polyolefin, such as polypropylene, polyethylene or the like. Other suitable materials, such as epoxies, other resins, such as a polyvinyl alcohol (PVA) based material, an ethylene vinyl alcohol (EVA) based material, an acrylonitrile butadiene styrene (ABS) based material, ionomers, methyl methacrylates and the like. Fillers can also be used as can blends of any of the materials, as suitable. Other materials will be recognized by those skilled in the art and are within the scope and spirit of the present invention.

In forming the collation 12, the nails 14 are first surface conditioned to enhance adhesion. Conditioning is first carried out by washing the nails in a caustic solution. The solution is a mildly acidic iron phosphate solution or a mildly alkaline solution. It was found that such a solution conditions the surface of the steel for adhesion with the plastic.

The conditioned nails 14 are fed into a collation forming machine 26. In the machine 26, the nails 14 are conveyed through a chute 28 and singulated for positioning into a conveyor 30 at a preselected angle that is the same as angle α, which in a present machine 26 and strip 10, is 22 degrees. The nails 14 are positioned on the conveyor 30 and aligned so that the tips 32 and heads 34 are all aligned with one another. In a present conveyor 30, the nails 14 are supported above and below (or outside of) the location at which the collations 12 will be formed. That is, the nails 14 are supported closer to the tips 32 and heads 34. A present conveyor 30 is formed from two continuous bands 36, 38, each having a plurality of spaced apart grooves 40 formed therein, much like a saw blade. The bands 36, 38 rotate opposing one another in loops with one side of each loop 36a, 38a parallel and nearest to the opposing side of the other loop. The fasteners (nails 14) are carried in the grooves 40 opposite one another as the two loops rotate, thus carrying the nails 14 in a flat (horizontal) plane P along a straight path through the collation forming machine 26. The bands 36, 38 are movable relative to one another to adjust the angle α, at which the nails 14 lie in between the bands 36, 38. The bands are driven by a drive, such as that indicated at 101. Overall machine 26 operation is provided by a controller 103. The nails 14 are aligned head-to-head by an aligning element 35.

The nails 14 are then conveyed to a preheater 42 where they are preheated. A preheat temperature of about 500 deg. F. to about 620 deg. F. is a suitable range, and a preferred temperature is about 600 deg. F. for use with the maleic anhydride modified polypropylene. Other temperatures may be better suited for other materials. Preheating is carried out using flame heating, however, induction heaters or any other suitable heating medium and method may be used. Heating is controlled by a sensor 44 (e.g., an infra-red sensor) immediately downstream of the heaters 42. In a present collation forming apparatus, upper and lower heaters 42a,b are used to heat the nails 14 from above and from below to provide more consistent and even preheating.

As seen in FIGS. 7-10, the nails are then conveyed to a collation forming station 43 having a pair of forming wheels 46, 48. The wheels 46, 48 are configured to carry and embrace the nails 14 and to mold the plastic (collations 12) between the nails 14 and grooves 50 formed in the wheels 46, 48. Accordingly, the plastic is introduced to the nails 14 immediately prior to the nails 14 entering the nip 52 between the wheels 46, 48. To effect plastic introduction or flow, a nozzle 54 is positioned above the nails and another nozzle 56 is positioned below the nails 14, just prior to the forming wheels 46, 48. The plastic is carried by the nails 14 into the space between the wheels 46, 48.

Plastic flow rate and temperature (from the nozzles 54, 56) are both controlled to effect proper collation 12 formation. The plastic flow is controlled by controlling the extruder (not shown) that supplies the plastic, that is the plastic feed, and by a gate or valve 58 (one shown) at the nozzles 54, 56. Sensors 57 in the nozzles 54, 56 monitor the temperature of the nozzles 54, 56. The plastic flows from the extruder exit to the nozzles 54, 56 through piping, tubing or conduit 60. In that the plastic is highly viscous, even though the extruder stops, plastic continues to flow from the extruder to the nozzles 54, 56. The valves 58 are configured to stop the flow of plastic but are also configured to prevent the build up of pressure at the nozzles 54, 56 (which could otherwise result in a shock of plastic when opened). As such, both a "shock" of plastic (upon resuming flow) and a drool of plastic (following isolation) are avoided. In this manner, flow is better controlled and waste is reduced.

Temperature of the plastic is also tightly controlled by heaters 62 located in the nozzles 54, 56. In this manner, the plastic is introduced to the nails 14 within a range of about 400 deg. F. to 440 deg. F., and preferably about 410 deg. F. Control of the plastic temperature at the nozzle 54, 56 (tip) also prevents the plastic from freezing (hardening) at the tip 64, thus interrupting the collation forming operation.

Figure 8:
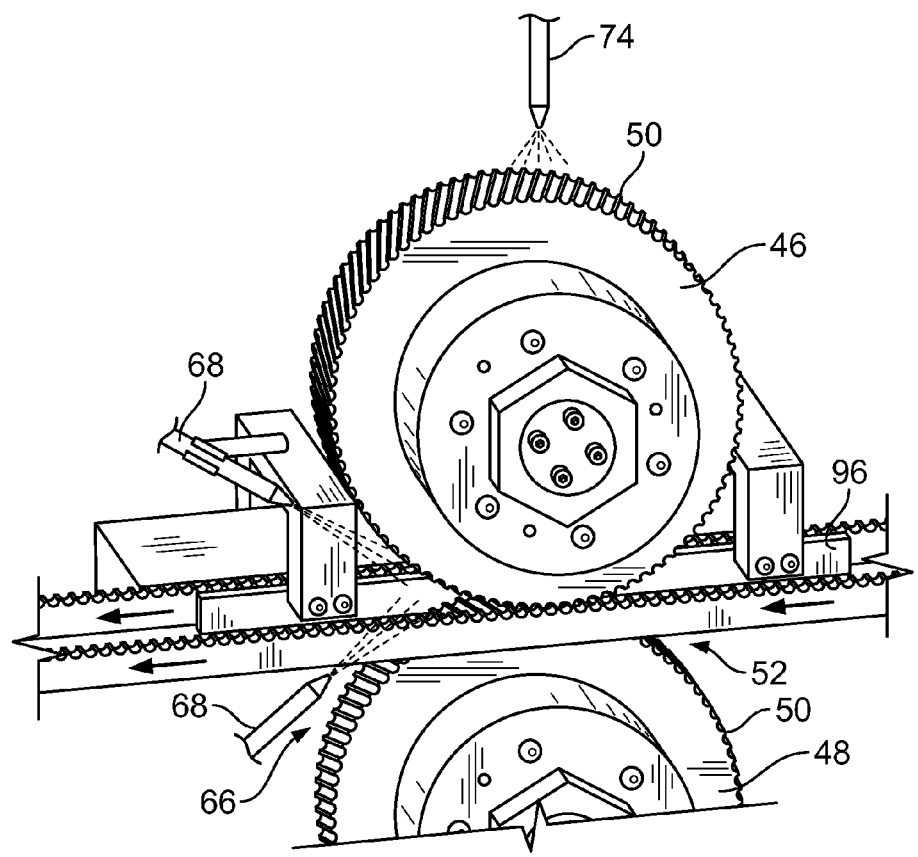
FIG. 8 shows the wheels in the closed or engaged state with the coolant vaporizers operating to spray vaporized water onto the fasteners.
Figure 9:
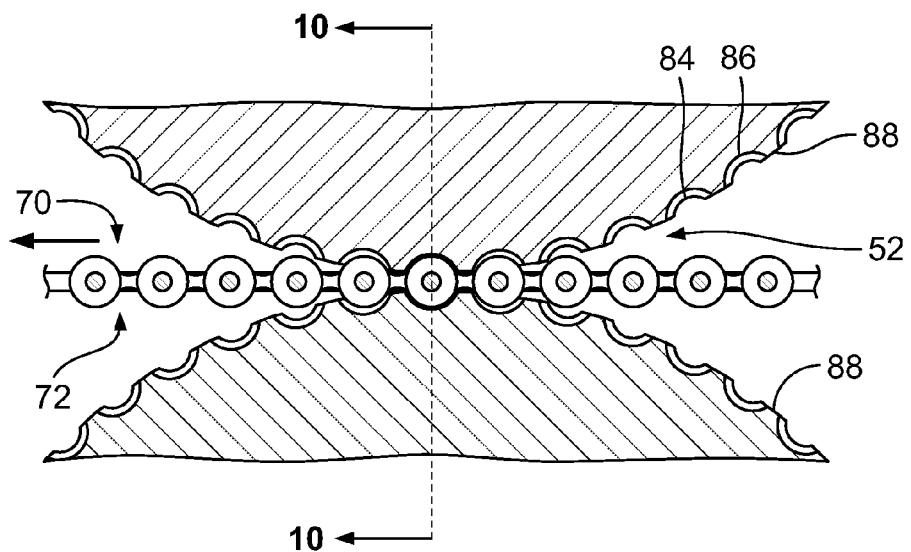
FIG. 9 is an illustration of the fasteners secured in and engaged by the forming wheels.

At the exit of the wheels (as indicated at 66 in FIG. 8), the plastic is hot and is still in a flowable state. In order to stabilize the collation 12, it is desirable to freeze the plastic—actually to cool the plastic—to a point such that an outer skin or layer is formed and is stable, although the plastic under the outer layer may still be in a plastic or flowable state. As such, the plastic is cooled by a spray of chilled water vapor at the exit 66 of the wheels 46, 48. As shown in FIG. 8, vapor spray nozzles 68 are located to spray water vapor V down onto the top surface 70 (as seen in FIG. 9) and up onto the bottom surface 72 of the collation 12 as it exits the forming wheels 46, 48, to better and more evenly cool the plastic collation 12 and facilitate curing.

It has also been found that in order for the wheels 46, 48 to properly conform the plastic 12 to the shape of the grooves 50 (in the wheels 46, 48), and to release the plastic from the wheels 46, 48 without sticking (at the exit 66), a spray of chilled water vapor is applied to the wheels 346, 48. In a present method, a vapor spray is applied onto the upper wheel 46 from an upper spray nozzle 74 at a point prior to the wheels 46, 48 engaging the plastic 12 and the nails 14. In a present arrangement, the water vapor is applied to the wheels at the apex of the wheels' path (e.g., the 12 o'clock position); however, the exact location can be varied to effect a desired machine configuration.

Figure 21:
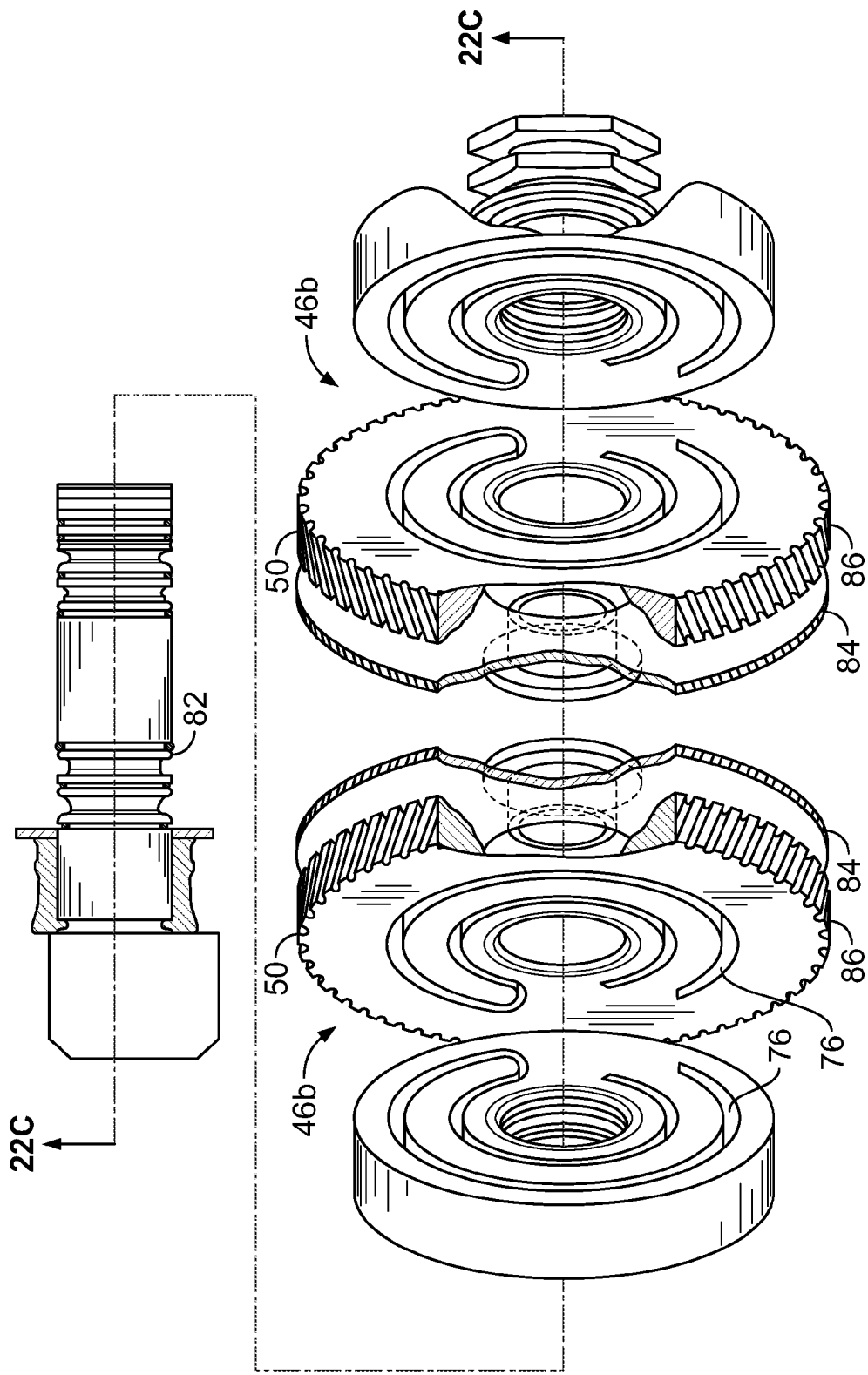
FIG. 21 is a partial sectional view of the forming wheel shaft.

In addition to externally cooling and lubricating the forming wheels 46, 48 (with the vapor spray 74), the wheels 46, 48 are cooled internally. As seen in FIGS. 21-22A-D, cooling channels 76 are formed in the wheels 46, 48 to maintain the wheels 46, 48 at a desired temperature. The cooling channels 76 are fed through channels 78 formed in the shaft 80 about which the wheels 46, 48 rotate. Seals 82 are positioned on the shaft 80 to maintain a seal between the rotating wheels 46, 48 and the stationary shaft 80. A liquid, preferably water is introduced into the shaft channels 78, flows into and through the wheels 46, 48 and out from the wheels 46, 48 through the channels 78 in the shaft 80. Cooling is provided independently to each wheel 46, 48 through respective channels 78 in the shaft 80. Other cooling fluids are, of course, contemplated by the present invention.

The wheels 46, 48 are of a novel design. There are four wheels, which include an upper 46 and a lower 48 wheel for each of the two collations formed on the nails 14. The upper and lower wheels 46, 48 act in concert in forming each of the collations 12.

Figure 10:
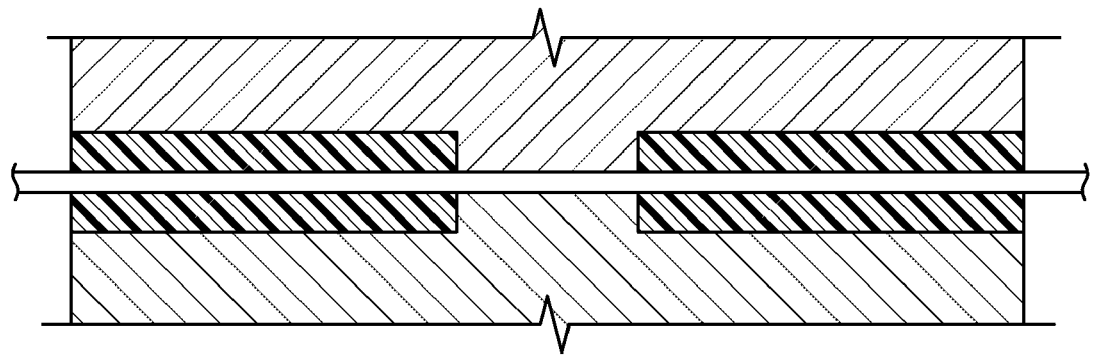
FIG. 10 is a sectional view taken along line 10-10 of FIG. 9.
Figure 11:
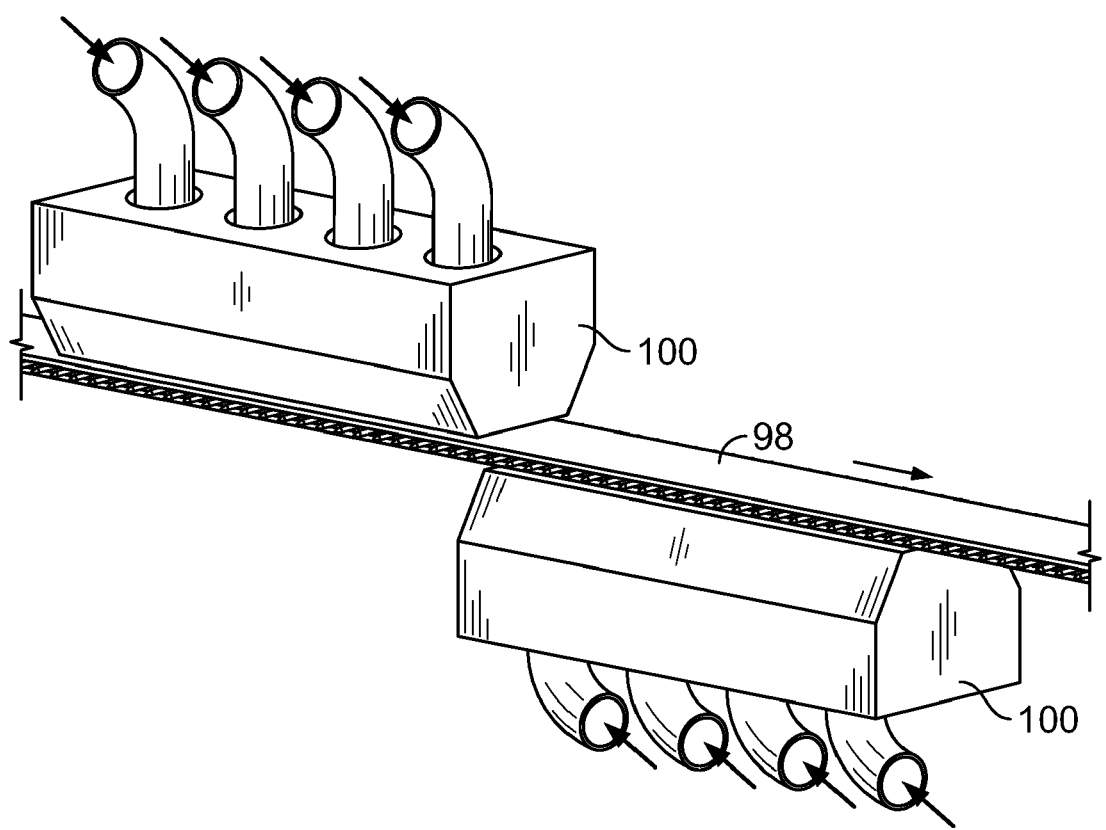
FIG. 11 is a perspective (front) view of the collation forming machine showing the gas (air) cooling station.
Figure 13:
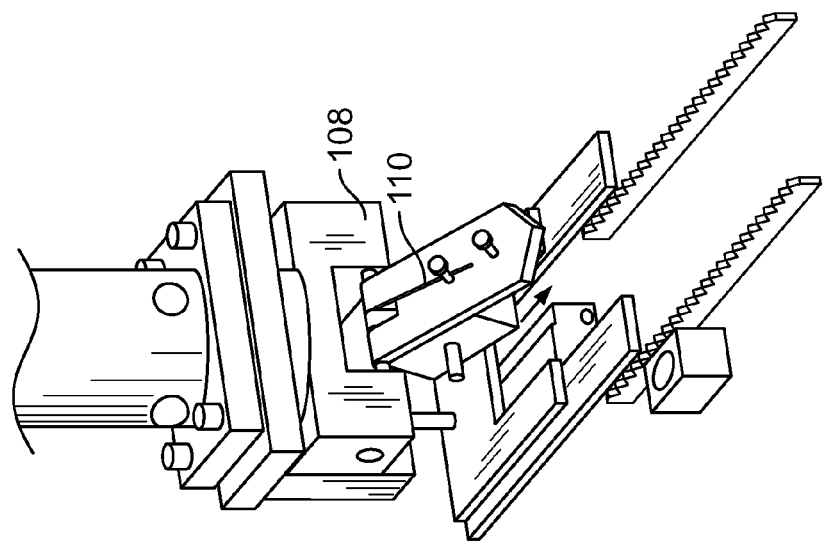
FIG. 13 is a view similar to FIG. 12 showing the blade section pivoting to move with the strip as the cut is made.
Figure 12:
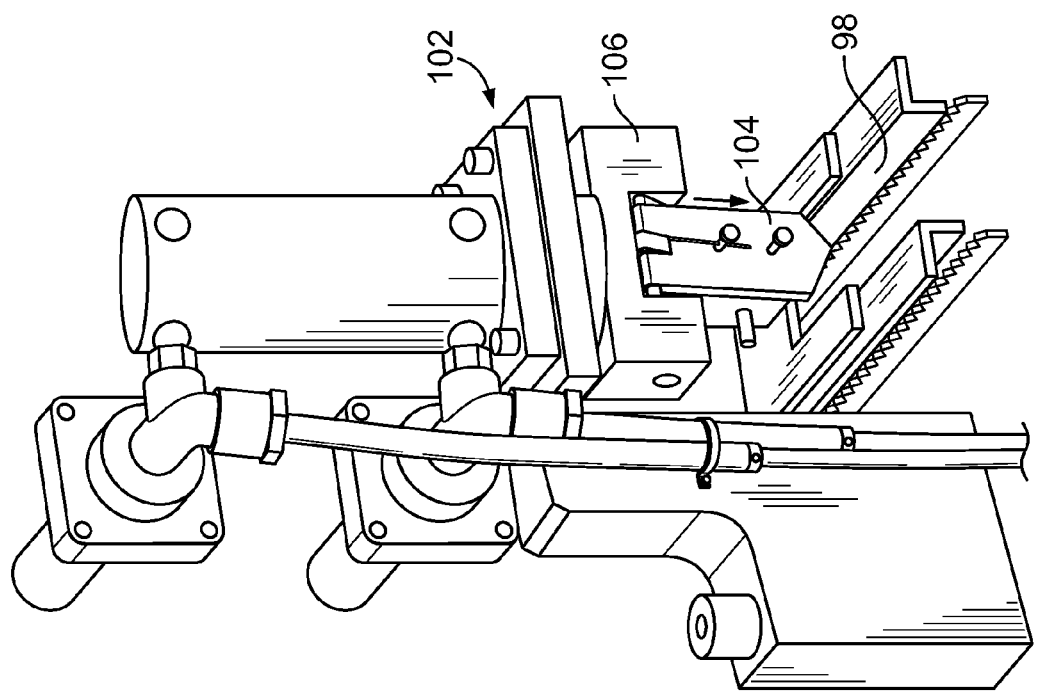
FIG. 12 is a perspective (front) view of the cutting station showing the cutting blade moving down to engage a portion of a fastener strip.
Figure 14:
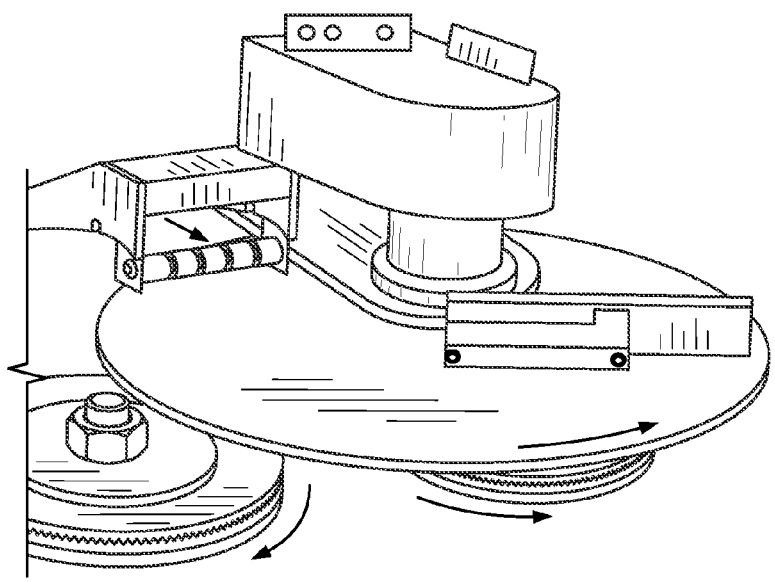
FIG. 14 is a perspective (front) view of the turning plate for moving the cut strips onto a second portion of the conveyor and showing an ejection paddle in the extended (ejection) state.
Figure 15:
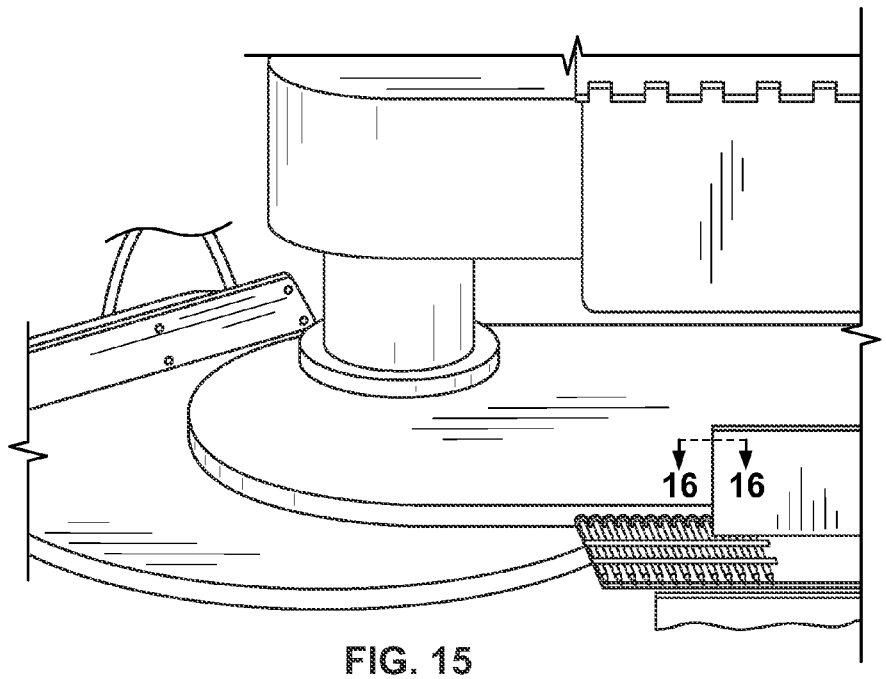
FIG. 15 is an opposite side view of the turning plate and showing a strip of fasteners moving onto the second portion of the conveyor.
Figure 16:
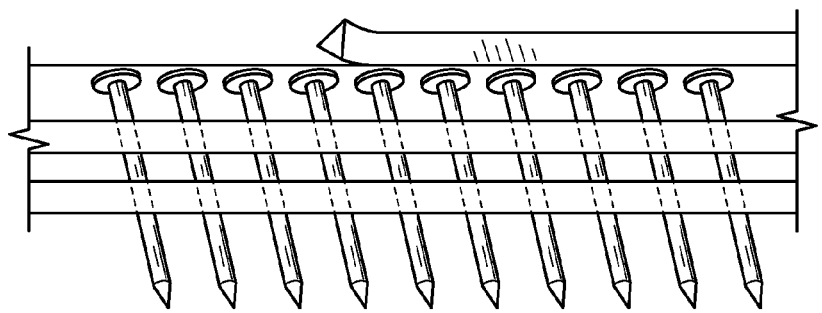
FIG. 16 is a top view of the nail strip on the second portion of the conveyor, as indicated at 16-16 in FIG. 15.
Figure 17:
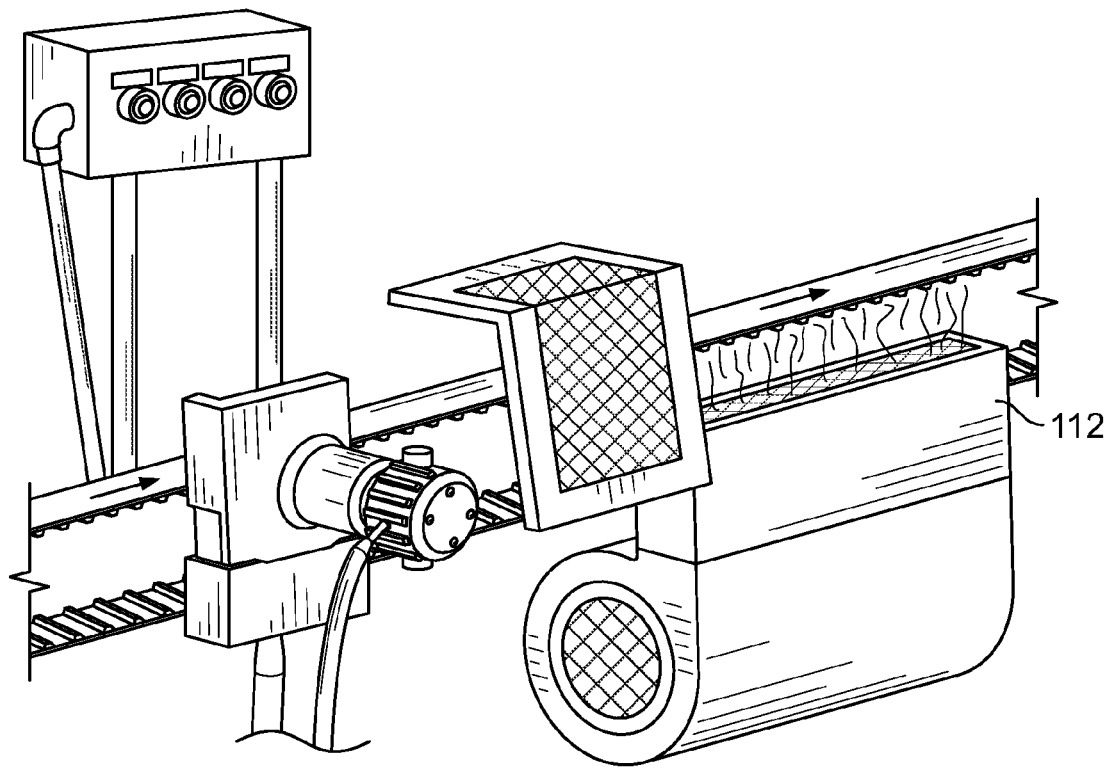
FIG. 17 is a perspective illustration of the tip coating preheater.
Figure 18:
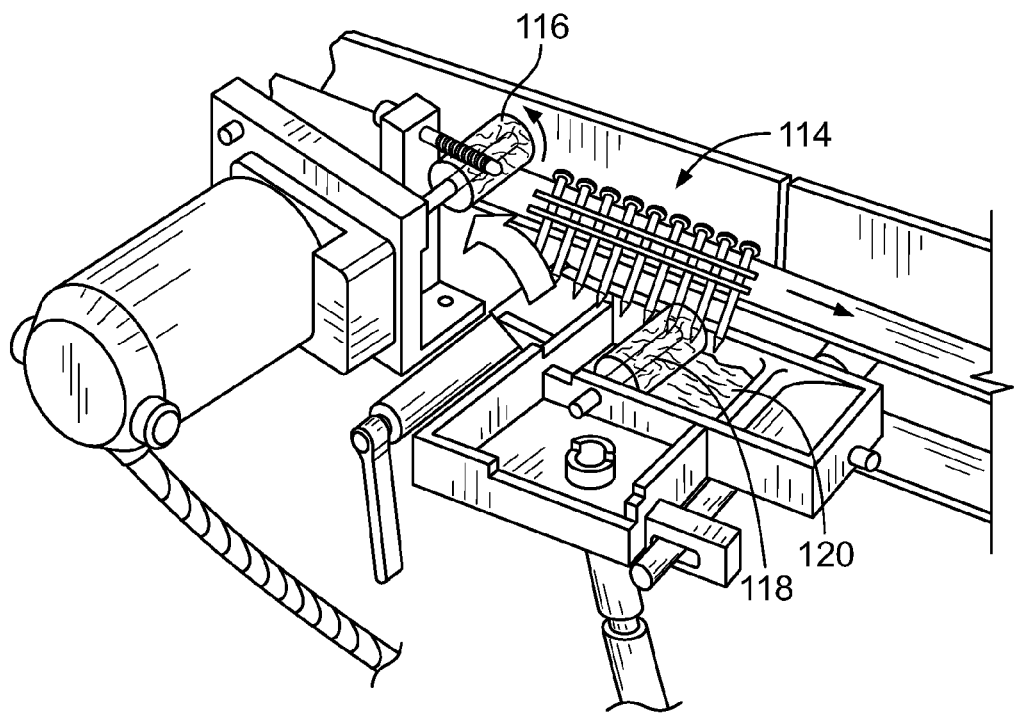
FIG. 18 is a perspective illustration of the tip coater.
Figure 19:
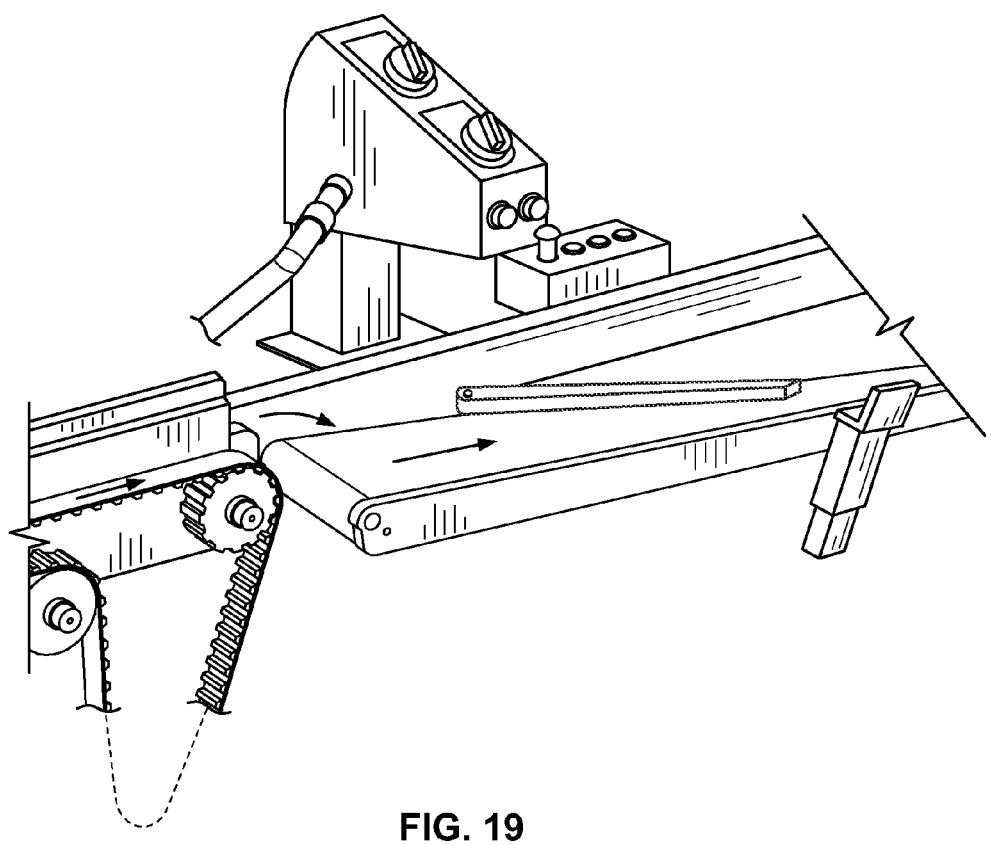
FIG. 19 is a perspective (front) view of the end of the conveyor (downstream of the tip coating station)
Figure 20:
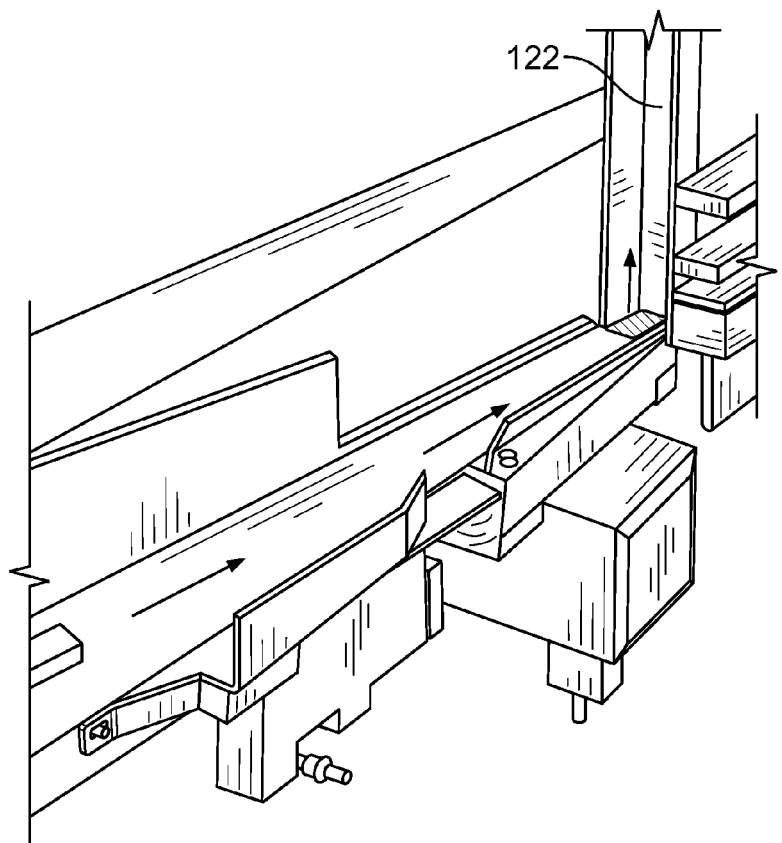
FIG. 20 is a perspective (front) view of the conveyor and stacker.

The wheels 46, 48 include a holding portion or groove 84 and a forming portion or groove 86. The nail 14 is held or secured in the holding portion 84, while the forming portion 86 has a lightly larger size groove and is that portion of the wheel 46, 48 in which the plastic forms (flows) around the nail 14. Essentially, the forming portions 86 of the upper 46 and lower 48 wheels form a mold cavity to form the collar 22 and connecting portions 24 of the collation 12. That is, there is sufficient space between the forming portions 86 (of the upper and lower wheels 46, 48) and the nail 14 to form the plastic collation 12 (the collar portion 22 of the collation 12), and sufficient space between the peaks 88 of the forming portions 86 to form the connecting portions 24 of the collations 12. The holding portions 84 are located, relative to the forming portions 84, to effect a desired collation profile. That is, if it is desired to form the collar 22 concentric with the shank 18, then the holding portion 84 is centered with the forming portion 86 (as seen in FIG. 10). Conversely, if it is desired to form the collar 22 eccentric relative to the shank 18, then the holding portion 84 is offset relative to the forming portion 86. In a present method, the holding portion 84 is centered relative to the forming portion 86 so that the collar 22 and shank 18 are concentric.

The wheels 46, 48 are also configured to allow some variation in the angle α of entry of the nails 14. It will be appreciated that the nails 14 are mass produced consumables and that the operating speed of the machine must be such that the collations 12 are formed at very high speeds. As such, although a desired angle (e.g., 20 degrees) is set by the various operations on the nails 14, there may be some slight variation in the angle (up to about +/−2.5 degrees) in which the collation is within acceptable tolerances. In order to accommodate that tolerance, and still provide an acceptable collation, the forming wheels 46, 48 are permitted to move (rotate) relative to one another with a small degree of freedom, and to allow some measure of misalignment of the nails 14 on the conveyor 30 relative to the wheels 46, 48.

As seen in FIG. 22B, the upper wheels 46*a,b* and the lower wheels 48*a,b* are mounted to one another by a stub 90 that extends between the wheels (e.g., 46*a,b*). The stub 90 is rigidly mounted to one of the wheels (e.g., 46*a*), but is mounted to the other wheel (e.g., 46*b*) with a resilient element 92 (such as an O-ring) fitted on the stub 90 which is fitted into an opening 94 in the wheel 46*b*. This provides the small degree of relative movement (or freedom) between the wheels 46*a,b*. In this manner, if there is a small variation in the angle of the nails (within tolerances of course) as they enter the wheels 46, 48, the nails 14 continue to move through the wheels 46, 48 without mishap. It will be appreciated that if the nails are rigidly held by the wheels, the nails can, if the angle is slightly off, wedge into the wheels or not fit within the grooves, resulting in a failed collation, machine shut down and related time and material costs.

As the nails 14 move through and beyond the forming wheels 46, 48 they are held down on the conveyor 30 by a pair of hold down rails 96. These rails 96, or skates, do not apply any significant pressure on the nails 14, but hold them down on the conveyor 30 to prevent the nails 14 from lifting with the wheels 46 (as they exit the wheels) or from lifting as the plastic 12 cools and cures. Shortly downstream of the vapor spray cooling 68, the rails 96 end and the nail collations are continued in the conveyor 30.

At this point in time, the outer layer of the plastic has begun to harden or cure, but the material between the outer layer and the body of the nail, although highly viscous, is still in a formable state. A side rail 98 is positioned downstream of the hold-down rails 96 to (axially) align the fasteners tip-to-tip or head-to-head. Typically any adjustment in the alignment is minimal, if needed at all, but can be done with the collation material in this state.

A further cooling step is carried out using air coolers 100 to force a gas, preferably chilled air, over the nails 14. Following the cooling step, the collations are sufficiently cooled and cured to be cut into strips 10 of a predetermined length or number of nails 14. The nail strips 10 are cut at a cutting station 102 that includes a cutter blade 104 that is mounted to a reciprocating carriage 106. The carriage 106 is also configured to pivot (as at 108) so that the cut can be effected on the moving strip 10 (that is, without slowing or stopping the strip). A biasing element 110, such as a spring returns the carriage 106 (and thus the cutter blade 104) to the home position following the cut.

Once cut, the nail strips 10 have a tip coating applied. Prior to coating, the nail tips 32 are heated, such as by the illustrated flame heater 112. Induction heaters or the like, as suitable, may also be used. The coating is then applied. The coating enhances or eases penetration of the nails 14 into a substrate, and can also enhance the holding power of the nails 14. The coating can be applied by conveying the nails 14 through a tip coater 114 that includes, for example, a pair of rotating foam rollers 116, 118, one of which 116 is positioned in a reservoir 120 of the coating material (liquid). Following coating and drying, the nail strips 10 are then stacked for packaging at a stacker 122.

It will be appreciated that although certain specific details, for example plastic temperature ranges, preheat temperatures and the like are provided, these specific details are those for use with the noted maleic anhydride modified polypropylene and it is anticipated that the specific temperatures and the like will vary for other materials.

All patents referred to herein, are incorporated herein by reference, whether or not specifically done so within the text of this disclosure.

In the present disclosure, the words "a" or "an" are to be taken to include both the singular and the plural. Conversely, any reference to plural items shall, where appropriate, include the singular.

From the foregoing it will be observed that numerous modifications and variations can be effectuated without departing from the true spirit and scope of the novel concepts of the present invention. It is to be understood that no limitation with respect to the specific embodiments illustrated is intended or should be inferred. The disclosure is intended to cover by the appended claims all such modifications as fall within the scope of the claims.

What is claimed is:

1. A method for making a collated fastener assembly comprising the steps of:
arranging a plurality of fasteners in a row parallel to one another, the fasteners being arranged in a plane, the fasteners each having a head and a tip;
preheating the plurality of fasteners to elevate the temperature of the fasteners;
applying a molten polymer material onto the preheated plurality of fasteners;
conveying the fasteners with the molten polymer thereon between a pair of forming wheels;
maintaining the fasteners in the plane;
molding the molten polymer material onto the preheated fasteners and between adjacent fasteners to form a plastic molding having a collar encircling a shank of each fastener and a connecting portion between adjacent fasteners; and
spraying a cooling vapor onto the fasteners and the plastic molding as the fasteners and the plastic molding exit from between the molding wheels.

2. The method in accordance with claim 1 wherein the fasteners are preheated to a temperature of about 500 deg. F. to about 620 deg. F.

3. The method in accordance with claim 1 wherein the molten polymer is heated to a temperature of about 400 deg. F. to about 440 deg. F. prior to applying to the fasteners.

4. The method in accordance with claim 1 wherein the cooling vapor is water.

5. The method in accordance with claim 1 including the step of forcing a gaseous cooling stream over the fasteners and the plastic molding cooling the strip to form the fastener assembly.

6. The method in accordance with claim 5 wherein in the step of forcing a gaseous cooling stream over the fasteners, air is the gaseous cooling stream.

7. The method in accordance with claim 1 including the step of severing a plurality of the fasteners from the fastener assembly.

8. The method in accordance with claim 1 including the step of coating each of the fasteners at about their respective tips.

9. The method in accordance with claim 8 including the step of preheating each of the fasteners at about their respective tips prior to coating each of the fasteners.

10. The method in accordance with claim 1 including the step of arranging the plurality of fasteners parallel to one another and at an angle to a longitudinal axis of each fastener between zero degrees and 90 degrees.

11. The method in accordance with claim 10 wherein the angle is between about 15 degrees and about 35 degrees.

12. The method in accordance with claim 11 including the step of measuring the angle.

13. The method in accordance with claim 1 including the step of aligning the fasteners with one another such that the head of each fastener is about aligned with the head of each other fastener.

14. The method in accordance with claim 13 wherein the aligning step is carried out prior to the step of preheating the plurality of fasteners.

15. The method in accordance with claim 14 including the step of realigning the fasteners with one another such that the head of each fastener is about aligned with the head of each other fastener following the step of molding the molten polymer on to the preheated fasteners.

16. The method in accordance with claim 1 wherein the plane in which the plurality of fasteners is arranged is a horizontal plane.

17. The method in accordance with claim 1 wherein the molten polymer material includes a heat activated adhesive and wherein preheating the plurality of fasteners activates, at least in part, the heat activated adhesive.

18. The method in accordance with claim 1 including the step of, at desired times, starting and stopping the flow of the molten polymer by actuation of valves at about respective polymer nozzles.

19. A method for making a fastener assembly comprising the steps of:
arranging a plurality of fasteners in a row parallel to one another, the fasteners being arranged in a horizontal plane, the fasteners each having a head and a tip;
aligning the fasteners with one another such that the head of each fastener is substantially aligned with the head of each other fastener;
preheating the plurality of fasteners to elevate the temperature of the fasteners;
adhering to the plurality of fasteners a polymer material by applying the polymer material in a molten form onto the preheated plurality of fasteners;
introducing the plurality of fasteners to a mold;
molding the molten polymer material onto the preheated fasteners and between adjacent fasteners to form a plastic molding having a collar encircling a shank of each fastener and a connecting portion between adjacent fasteners; and
spraying a cooling vapor onto the fasteners and the plastic molding following the molding step.

20. The method in accordance with claim 19 wherein the fasteners are preheated to a temperature of about 500 deg. F. to about 620 deg. F.

21. The method in accordance with claim 19 wherein the molten polymer is heated to a temperature of about 400 deg. F. to about 440 deg. F. prior to applying to the fasteners.

22. The method in accordance with claim 19 wherein the cooling vapor is water.

23. The method in accordance with claim 19 including the step of arranging the plurality of fasteners parallel to one another and at an angle to a longitudinal axis of each fastener between zero degrees and 90 degrees.

24. The method in accordance with claim 19 wherein the molten polymer material includes a heat activated adhesive and wherein preheating the plurality of fasteners activates, at least in part, the heat activated adhesive.

25. The method in accordance with claim 19 including the step of, at desired times, starting and stopping the flow of the molten polymer by actuation of valves at about respective polymer nozzles.

26. The method in accordance with claim 19 including the step of forcing a gaseous cooling stream over the fasteners and the plastic molding cooling the strip to form the fastener assembly.

27. The method in accordance with claim 19 wherein the step of introducing the plurality of fasteners to a mold includes introducing the plurality of fasteners to a pair of forming wheels.

* * * * *